United States Patent [19]

Möller

[11] Patent Number: 4,511,110

[45] Date of Patent: Apr. 16, 1985

[54] SCISSORS LIFT TABLE

[75] Inventor: Reinfried Möller, Weinheim, Fed. Rep. of Germany

[73] Assignee: Expert Maschinenbau GmbH, Lorsch, Fed. Rep. of Germany

[21] Appl. No.: 473,350

[22] Filed: Mar. 8, 1983

[30] Foreign Application Priority Data

Mar. 9, 1982 [DE] Fed. Rep. of Germany ....... 3208400

[51] Int. Cl.[3] .......................................... F16M 13/00

[52] U.S. Cl. .................................... 248/421; 108/147

[58] Field of Search ............... 248/404, 421, 422, 406, 248/188.4, 188.2; 254/103; 108/147, 144, 148, 95, 96; 280/43; 414/678, 349

[56] References Cited

U.S. PATENT DOCUMENTS

| | | | |
|---|---|---|---|
| 1,080,375 | 12/1913 | Senderling | 108/147 X |
| 1,534,364 | 4/1925 | Diaz | 414/678 X |
| 1,697,364 | 1/1929 | McCollum et al. | 414/678 |
| 1,890,361 | 12/1932 | Beattie | 108/147 X |
| 2,752,205 | 6/1956 | Ward et al. | 254/103 X |
| 3,314,637 | 4/1967 | Fudala | 248/421 X |
| 3,438,514 | 4/1969 | Bose et al. | 254/103 X |
| 3,923,296 | 12/1975 | Oksala et al. | 414/678 X |
| 4,031,982 | 6/1977 | Lindfors | 414/678 X |
| 4,073,386 | 2/1978 | Denomme | 414/677 |
| 4,232,901 | 11/1980 | Harrington et al. | 108/147 X |

FOREIGN PATENT DOCUMENTS

| | | | |
|---|---|---|---|
| 2841563 | 12/1979 | Fed. Rep. of Germany | 414/349 |
| 977626 | 12/1964 | United Kingdom | 108/147 |

*Primary Examiner*—J. Franklin Foss

[57] ABSTRACT

A drive for the scissors mechanism of a scissors lift table (10) which comprises a lift platform (12) supported on a base frame (14) by a scissors mechanism comprising at least two laterally adjacent pairs of scissors lift arms (18,20). The drive comprises at least one cylindrical roller (38) which is motor-driven in rotation and provided with an indexing groove (40) machined in its cylindrical surface. The indexing groove (40) is engaged by an indexing pin (42) which is attached to an elongate carriage (44) slidable parallel to the axis of rotation of the cylindrical roller (38). The carriage (44) carries a rack (46), which meshes with a toothed pinion (48), which is mounted on a shaft provided with further toothed pinions (56), which in turn mesh with toothed segments (58) provided on one (20) of the scissors arms (18,20) of each pair of the scissors mechanism.

6 Claims, 3 Drawing Figures

SCISSORS LIFT TABLE

BACKGROUND OF THE INVENTION

The invention relates to a scissors lift table comprising a lift platform raisable above and lowerable onto a base frame in a vertical direction by means of a scissors mechanism, the scissors mechanism comprising at least two laterally adjacent scissors arm pairs, each having two scissors arms mutually pivotably coupled in their median region and pivotable relative to each other by a drive device, one end of each of which arms is mounted stationary but rotatably on the lift platform or the base frame and the other end of which is guided slidably in the base frame or the lift platform.

Scissors lift tables of this type are suitable for use wherever loads are required to be raised, for example when charging transfer lines in the motor vehicle body industry, tool packaging machines and processing machines. The drive, at least in the case of lift tables for comparatively heavy loads, is effected hydraulically by one or more hydraulic cylinders mounted on the scissors mechanism, which are loaded during the lifting process with hydraulic fluid delivered by a hydraulic pump driven by an electric motor, a non-return valve bearing provided in the pressure pipe to the hydraulic cylinder(s) in order to prevent any undesired lowering of the lift platform due to a return flow of the hydraulic fluid after the hydraulic pump is switched off. The lowering of the platform is effected by actuating a discharge valve—conveniently incorporated into the non-return valve. However, only relatively slow lifting speeds are achieved with hydraulic lift table drives of this type. Moreover, hydraulic systems are critical as regards the stroke constancy under load, even in the presence of the above-mentioned non-return valve, because leakages may occur in hydraulic systems, which are reflected in (slight) stroke losses. A further difficulty occurs when it is also required to drive the lift platform precisely into one or more intermediate stroke positions in prescribed vertical locations.

SUMMARY OF THE INVENTION

According to the invention there is provided a scissors lift table comprising a lift platform raisable above and lowerable onto a base frame in a vertical direction by means of a scissors mechanism, the scissors mechanism comprising at least two laterally adjacent scissors arm pairs, each comprising two scissors arms mutually pivotably coupled in their median region and pivotable relative to each other by drive means, one end of each arm of each arm pair being mounted stationarily but rotatably on the lift platform or the base frame respectively and the other end of each arm of each arm pair being slidably guided in the base frame or the lift platform respectively. The drive means comprises an elongate cylindrical roller adapted to be motor-driven in rotation, which is mounted stationarily relative to the base frame and has an indexing groove provided in its cylindrical surface as a driving member, an indexing pin which engages in the groove and is arranged on a driven member forming an elongate carriage which is guided for longitudinal sliding movement. The carriage carries a rack which meshes with a first toothed pinion which is operatively coupled with a second toothed pinion which meshes with a toothed segment on one of the scissors arms, the center of the pitch circle radius of the toothed segment coinciding with the stationary pivot point of the said scissors arm on the base frame.

The speed and acceleration characteristics and also the location and number of the intermediate stroke positions can thus be determined exclusively by the configuration of the indexing groove in the cylindrical roller, so that a complete variation of the entire stroke characteristics of an otherwise unmodified scissors lift table can be achieved simply by modification of the indexing groove. The subsequent adaptation of a scissors lift table to changed requirements is therefore possible merely by replacing one cylindrical roller with another cylindrical roller with a correspondingly modified indexing groove. It is also possible to a considerable extent to produce for stock, scissors lift tables which require only to be completed by a cylindrical roller which is provided with an indexing groove in accordance with a customer's specific requirements. In this case the blanks of the cylindrical roller may also be produced in advance for stock, and then simply have the indexing groove of corresponding characteristics milled into them.

The scissors mechanism of a scissors lift table may comprise two scissors arm pairs respectively arranged laterally spaced apart on opposite sides of the vertical longitudinal median plane of the scissors lift table. The cylindrical roller and the carriage may then be arranged in the space between the scissors arm pairs on the opposite sides of the longitudinal median plane of the scissors lift table, whereby no additional space is required for the drive means laterally beside the scissors lift table. In this case the cylindrical roller may be conveniently supported, with a horizontal axis of rotation, approximately centrally in the space between the scissors arm pairs, and the carriage may be guided directly above the cylindrical roller with longitudinal sliding movement and parallel to the axis of rotation of the cylindrical roller. The indexing pin engaging into the indexing groove of the cylindrical roller may project from the underside of the carriage, and the rack may be arranged on the upper side of the carriage. A toothed pinion meshing in each case with a toothed segment on one of the scissors arms of each pair may then be provided on the same shaft, one on each side of the toothed pinion meshing with the rack. That is to say, the two scissors arm pairs can be driven positively and simultaneously by the same cylindrical roller.

For scissors lift tables of comparatively great length, two similar scissors mechanisms each with two scissors arm pairs may be arranged mutually staggered in the longitudinal direction of the scissors lift table between the lift platform and the base frame. The arrangement is preferably such that a cylindrical roller and a carriage are associated with each of the scissors mechanisms, and the indexing grooves of the two cylindrical rollers have the same characteristics and the two cylindrical rollers are connected by a common drive shaft.

In this case it is then possible to arrange on the common drive shaft a worm wheel which rotates with the drive shaft and which meshes with a worm pinion which is drivable by a motor drive unit arranged laterally beside the base frame.

When it is necessary to provide high driving power, e.g. because the scissors lift table is intended to be used for heavy loads with large dimensions, in the case of a scissors lift table comprising two similar scissors mechanisms arranged mutually staggered in the longitudinal direction of the scissors lift table between the lift platform and the base frame, each mechanism comprising two scissors arm pairs respectively arranged laterally spaced apart on opposite sides of the vertical longitudinal median plane of the scissors lift table, it is advisable to provide a cylindrical roller, with horizontal axis orientated parallel to the longitudinal axis of the scissors lift table, on each of the opposite sides beside each scissors arm pair. The cylindrical rollers arranged on the same side of the lift table can then be connected by a common drive shaft. A worm wheel, with which a worm pinion mounted for rotation on a transversely orientated shaft adapted to be motor-driven meshes, may be arranged on each of the common drive shafts for rotation therewith.

BRIEF DESCRIPTION OF THE DRAWING

An embodiment of the invention will now be described, by way of example only, with reference to the accompanying drawings, in which.

DETAILED DESCRIPTION OF A PREFERRED EMBODIMENT

Figure 1:
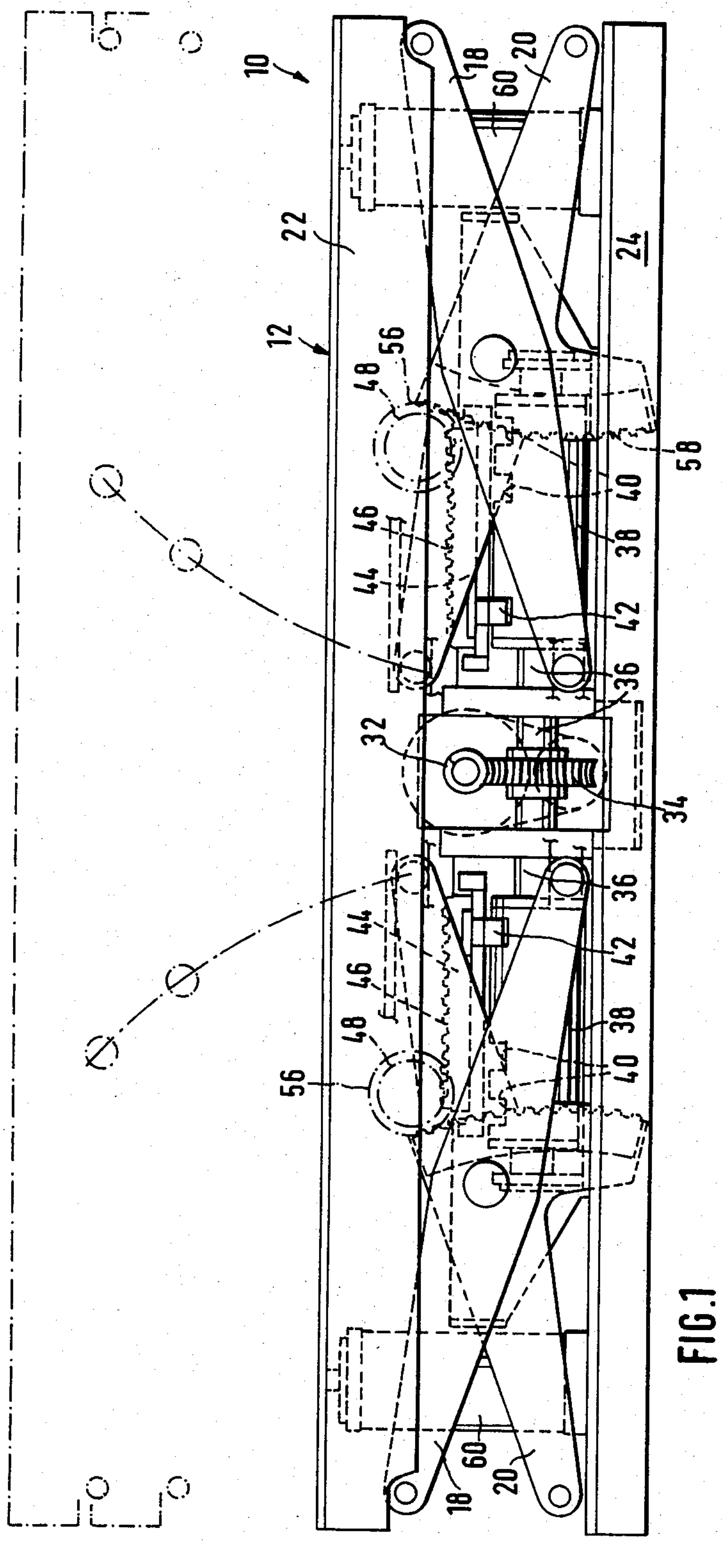
FIG. 1 shows a schematic side elevation of an embodiment of a scissors lift table according to the invention.
Figure 2:
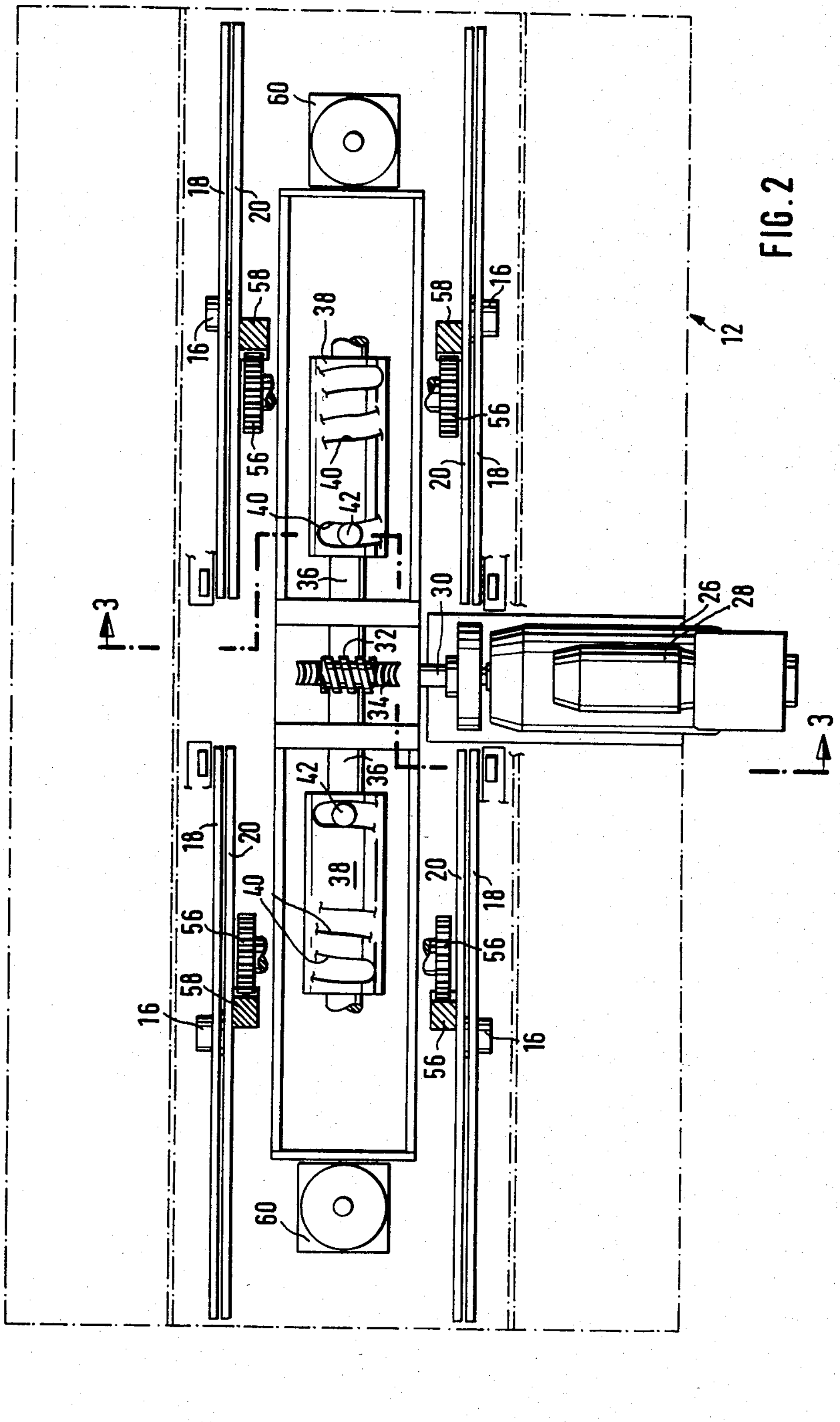
FIG. 2 shows a plan of the scissors lift table of FIG. 1.
Figure 3:
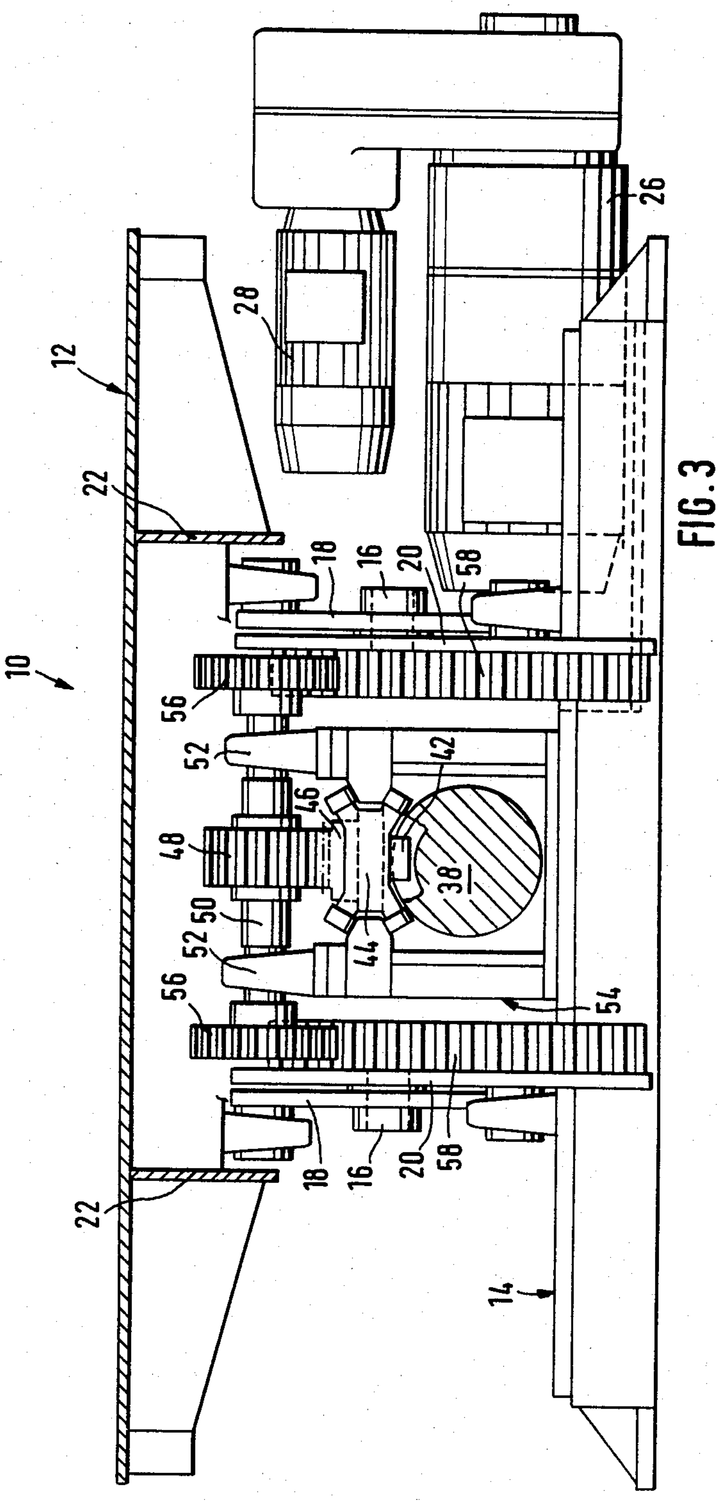
FIG. 3 shows a section along lines 3—3 in FIG. 2 of the scissors lift table of FIG. 1.

The drawings show a scissors lift table 10 in the lowered end of stroke position, the top end of stroke position of the lift platform 12 of the lift table, and also an intermediate stroke position, being additionally illustrated by chain-dotted lines. The term "lift platform" is used herein to designate quite generally a supporting structure upon which a load to be raised can be placed in any manner. In the embodiment illustrated, the lift platform is a frame structure made of welded longitudinal and transverse girders, upon which a platform in the narrower sense, that is to say a plate-type plane load surface, has been welded.

The lift platform 12, and a base frame 14 likewise made of welded steel girders, are mutually connected by two scissors mechanisms staggered in the longitudinal direction of the table, each of which is formed by two pairs of scissors arms 18, 20, the pairs being arranged parallel at laterally spaced intervals, and the arms of each pair being mutually coupled pivotably in their central region by a bearing bolt 16. One end of each of the scissors arms 18, 20 is mounted stationary but rotatably on one of the longitudinal girders 22, 24 of the lift platform 12 or of the base frame 14, whereas its other end is guided for sliding movement in the horizontal direction on the longitudinal girders 24, 22 of the base frame 14 or of the lift platform 12. Since the lift table as so far described corresponds to known scissors lift tables, no detailed description of its structural configuration as regards the manner of the rotatable mounting and of the slidable guidance of the scissor arm ends on the lift platform 12 or on the base frame 14 is necessary, and reference can be made in this respect to the construction of scissors lift tables quite generally.

The lift drive means will, however, be described in more detail below. Since as described above the two scissors mechanisms of the scissors lift table are arranged symmetrically with reference to the vertical plane passing at right angles to the longitudinal axis of the scissors lift table, it will be sufficient to describe the lift drive means of one scissors mechanism, the second lift drive means associated with the other scissors mechanism should then be imagined arranged in the same manner but symmetrically to the said transverse plane. However, a common drive motor 26 with associated fine-pitch drive 28 is provided for both lift drive means. The drive motor is arranged approximately in the center laterally of the base frame 14. A rotatably mounted shaft 30 passing transversely through the lift table 10 is driven either directly or through a V-belt drive or the like, and carries a worm pinion 32 which meshes with a worm wheel 34 which is mounted on a shaft 36 arranged centrally in the longitudinal direction of the lift table, which shaft drives at each of its ends an elongate cylindrical roller 38 mounted rotatably, with horizontal axis, centrally between the two pairs of scissors arms 18, 20 of the scissors mechanisms. An indexing groove 40 is milled in the circumferential surface of each of the cylindrical rollers 38, into which an indexing pin 42 engages which projects from the underside of an elongate carriage 44 arranged slidably in the longitudinal direction of the lift table above the respective cylindrical rollers 38. Therefore, when the cylindrical rollers 38 are driven, the associated carriage 44 is entrained in the longitudinal direction of the lift table in a manner corresponding to the configuration of the indexing groove 40. A rack 46 is arranged on the upper side of the carriage 44 and meshes with a toothed pinion 48 which is in turn mounted on a shaff 50 oriented transversely at right angles to the longitudinal direction of the lift table. The shaft 50 is mounted rotatably in bearings 52 which are supported by a framework 54 arranged between the pairs of scissors arms 18, 20 and simultaneously supporting longitudinal guides for the carriage 44. The free ends of the shaft 50, which pass through the bearings 52, each carry a toothed pinion 56, each of which meshes with a toothed segment 58 which is rigidly attached to the corresponding scissors arm 20 which is mounted pivotably but non-slidably on the base frame 14, the center of the pitch circle of the segment 58 coinciding with the stationary pivot point of the scissors arm 20 on the base frame.

The speed behavior and acceleration behavior of the lift platform, when the drive motor 26 is driven (at constant speed), are determined exclusively by the configuration of the indexing groove 40. It is therefore possible, by appropriate mathematical specification and control of the configuration of the indexing groove 40 when it is milled in the indexing roller 38, to provide shock-free and jerk-free lift characteristics. The precise modulation of prescribed intermediate stroke positions can also be provided without difficulty, since the part of the indexing groove 40 associated with this intermediate position can be designed to extend precisely in the circumferential direction of the cylindrical roller 38, that is to say with zero pitch.

Therefore, since the stroke characteristics of the lift table are determined exclusively by the configuration of the indexing groove 40, it is obvious that the adaptation of the stroke characteristics of otherwise identical scissors lift tables is possible simply by exchanging the cylindrical rollers 38 for other rollers with appropriately modified indexing groove configurations.

There is thus provided a scissors lift table, the stroke movement of which can occur comparatively rapidly and which is readily adaptable, without difficulty and for a small outlay, to different existing requirements as regards the speed and acceleration characteristics of its stroke movement and also as regards the location and number of the intermediate stroke positions in which it can be positioned precisely, and at the same time totally fulfils the safety requirements.

It is obvious that variations and further developments of the embodiment described above are possible within the scope of the invention as defined by the appendent claims. Thus, instead of the arrangement of the cylindrical rollers 38 and carriages 44 centrally between the pairs of scissors arms of the scissors mechanism, which arrangement is space-saving and favorable as regards the symmetrical transmission of the driving forces, the cylindrical rollers and associated carriages may be arranged on opposite sides of the lift table, each laterally beside scissors arm pairs of the scissors mechanisms. Such a double lateral arrangement of cylindrical rollers may be provided particularly if the scissors lift table is intended to receive comparatively heavy loads. Alternatively, however, an increase in the payload of the embodiment described above with cylindrical rollers arranged centrally between the scissors arm pairs can also be accommodated if pneumatic stroke cylinders controllable by pressurized air in a suitable manner from a pressurized air source are provided between the base frame and the lift platform to assume part of the lifting forces and correspondingly relieve the mechanical drive means.

I claim:

1. A scissors lift table comprising a lift platform, a scissors mechanism for raising said platform above and for lowering said platform onto a base frame in a vertical direction, said scissors mechanism comprising at least two laterally adjacent scissors arm pairs, each comprising two scissors arms mutually pivotably coupled in their median region and pivotable relative to each other, drive means for pivoting said arms, one end of each arm of each arm pair being mounted stationarily but rotatably on the lift platform or the base frame respectively and the other end of each arm of each pair being slidably guided in the base frame or the lift platform respectively, said drive means comprising an elongate cylindrical roller adapted to be motor-driven in rotation, which is mounted stationarily relative to the base frame and has an indexing groove provided in its cylindrical surface as a driving member, an indexing pin which engages in the groove and is arranged on a driven member forming an elongate carriage which is guided for longitudinal sliding movement, the carriage carrying a rack which meshes with a first toothed pinion which is operatively coupled with a second toothed pinion which meshes with a toothed segment on one of the scissors arms, the center of the pitch circle radius of the toothed segment coinciding with the stationary pivot point of said scissors arm on the base frame.

2. A scissors lift table according to claim 1, wherein the scissors mechanism comprises two scissors arm pairs respectively arranged on opposite sides of the vertical longitudinal median plane of the scissors lift table, and wherein the cylindrical roller and the carriage are arranged in the space between the scissors arm pairs.

3. A scissors lift table according to claim 2, wherein the cylindrical roller is supported with its axis of rotation horizontally approximately centrally in the space between the scissors arm pairs, the carriage is guided directly above the cylindrical roller for longitudinal sliding movement parallel to the axis of rotation of the cylindrical roller, the indexing pin engaging in the indexing groove of the cylindrical roller projects from the underside of the carriage, the rack is arranged on the upper side of the carriage, and two second toothed pinions each meshing with a said toothed segment on one arm of each scissors arm pair are provided on the same shaft one on each side of the first toothed pinion.

4. A scissors lift table according to either claim 2 or claim 3, wherein two similar scissors mechanisms are arranged mutually staggered in the longitudinal direction of the scissors lift table between the lift platform and the base frame, wherein a cylindrical roller and a carriage are associated with each of the scissors mechanisms, the indexing groove of the two cylindrical rollers have the same characteristics, and the two cylindrical rollers are connected by a common drive shaft.

5. A scissors lift table according to claim 4, wherein a worm wheel is provided secure against rotation on the common drive shaft and meshes with a worm pinion which is drivable by a motor drive unit arranged laterally of the base frame.

6. A scissors lift table according to claim 1, wherein two similar scissors mechanisms are arranged mutually staggered in the longitudinal direction of the scissors lift table between the lift platform and the base frame, each mechanism comprising two scissors arm pairs respectively laterally spaced apart on opposite sides of the vertical longitudinal median plane of the scissors lift table, wherein a cylindrical roller, arranged with its axis horizontal and parallel to the longitudinal axis of the scissors lift table, and a carriage are provided on each side of the scissors lift table, besides each scissors arm pair, the cylindrical rollers arranged on the same side of the scissors lift table being connected by a common drive shaft, and wherein a worm wheel, with which a worm pinion, mounted for rotation with a transversely oriented shaft adapted to be motor-driven, meshes, is arranged on each of the common drive shafts for rotation therewith.

* * * * *